United States Patent [19]

Culter

[11] Patent Number: 4,558,372

[45] Date of Patent: Dec. 10, 1985

[54] SCANNING METHOD AND APPARATUS

[75] Inventor: Robert G. Culter, Beaverton, Oreg.

[73] Assignee: Tektronix, Inc., Beaverton, Oreg.

[21] Appl. No.: 571,990

[22] Filed: Jan. 19, 1984

[51] Int. Cl.[4] .............................................. H04N 1/36
[52] U.S. Cl. .................................... 358/264; 358/286;
358/293; 358/289; 250/578
[58] Field of Search ............... 358/286, 256, 293, 294,
358/264, 213, 289; 250/578

[56] References Cited

U.S. PATENT DOCUMENTS

| | | | |
|---|---|---|---|
| 3,950,615 | 4/1976 | Murase | 358/264 |
| 4,007,489 | 2/1977 | Helmberger et al. | 358/264 |
| 4,178,471 | 12/1979 | Ohnishi | 358/264 |
| 4,404,596 | 9/1983 | Juergensen et al. | 358/293 |
| 4,449,046 | 5/1984 | Zuckerman et al. | 358/293 |

Primary Examiner—Edward L. Coles, Sr.
Attorney, Agent, or Firm—John Smith-Hill; Francis I. Gray

[57] ABSTRACT

A document scanner compensates for mechanical misalignment between a document and a photosensitive array by storing pixel information from the array and timing the output of such information in accordance with stored offset values which represent the mechanical misalignment for successive relative positions of the document and of the array.

14 Claims, 4 Drawing Figures

SCANNING METHOD AND APPARATUS

BACKGROUND OF THE INVENTION

The present invention relates to a scanning method and apparatus and particularly to a method and apparatus for scanning documents and providing an accurate electrical representation of such documents without requiring exact mechanical alignment of the scanning mechanism.

In document scanners, either of the "pushbroom" type wherein a photosensitive array is moved relative to a document or the rotating drum type wherein the document is moved with respect to a photosensitive array, mechanical misalignment or imperfection in the mechanical movement can cause a skewed or distorted electrical output.

Typically, a line of pixels oriented in the X axis direction is imaged on a linear photosensitive array such as a charge coupled device, while the charge coupled device is scanned mechanically in the Y axis direction, either by movement of the device or by movement of the document being scanned. This motion provides a swath of pixels perpendicular to the X axis. If the mechanical scan mechanism, for example a "y-arm", is not perfectly straight and perpendicular to the X axis, scanning inaccuracy will result. For instance, a "vertical" line in the Y direction will appear wavy or crooked if reproduced from the electrical output.

Of course, this problem could be solved by providing a nearly perfect mechanical scan mechanism and nearly perfect alignment between the scanning apparatus and the document being scanned. However, such a solution is often impractical and expensive.

SUMMARY OF THE INVENTION

In accordance with the present invention fewer than the maximum number of the pixels generated by a photosensitive array are employed to produce the eventual output from a scanner and the retained pixels are selected for providing a linear output. In a preferred embodiment, first means receives serial data from the photosensitive array and second means electrically reads out such data in accordance with the relative physical position between the array and the information, in order to adjust the data to compensate for mechanical mispositioning.

In accordance with a particular embodiment, the first means desirably comprises a memory device, for example a random access memory for receiving data from the photosensitive array, and the second means comprises means for addressing and reading out such data in the memory device in accordance with the relative physical position between the photosensitive array and the document or information being read out.

It is accordingly an object of the present invention to provide improved document scanning by photosensitive means in a manner to compensate for mechanical imperfections in the scanning apparatus.

It is another object of the present invention to provide an improved method and apparatus for electrically scanning a document without requiring strict alignment specifications or tight tolerances in mechanical drive means.

It is the further object of the present invention to provide an improved method and apparatus for supplying an accurate electrical output from electro-mechanical scanning apparatus.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

FIG. 1 is a block diagram of a first embodiment of apparatus according to the present invention, FIG. 2 illustrates document-scanner misalignment, and correction thereof according to the method and apparatus of the present invention, FIG. 3 schematically illustrates apparatus according to a second embodiment of the present invention, and FIG. 4 illustrates a misalignment problem encountered with said second apparatus, and correction thereof according to the method and apparatus of the present invention.

DETAILED DESCRIPTION

Figure 1:
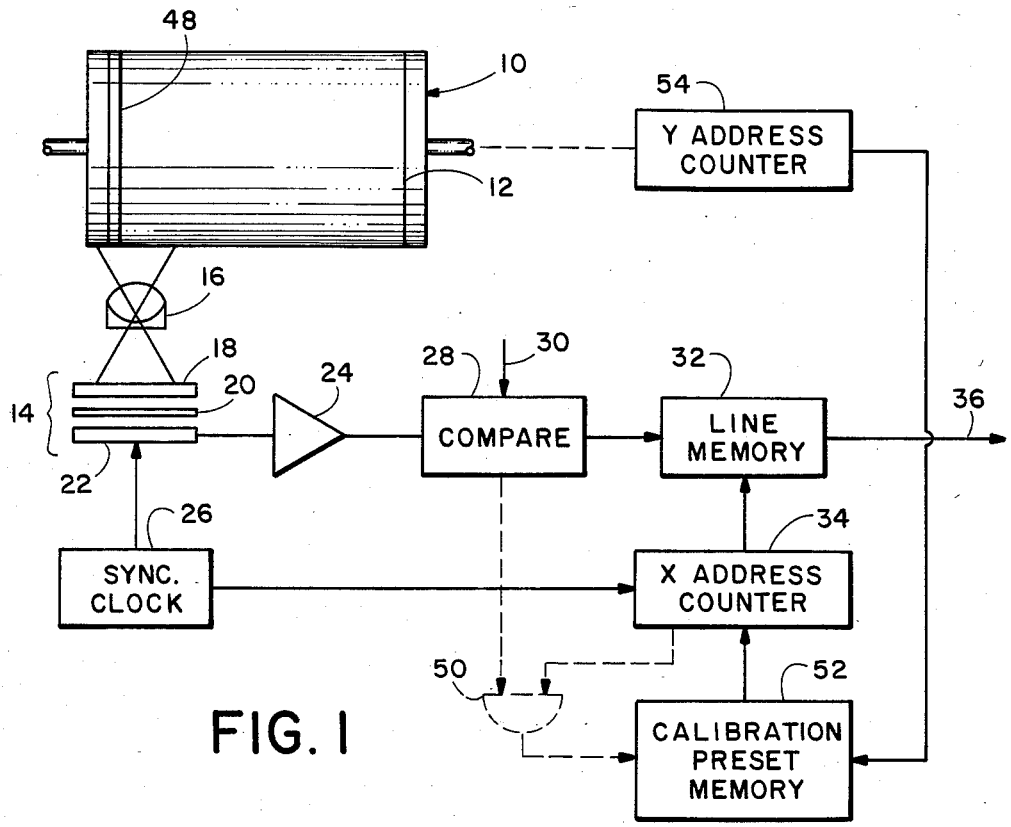

Referring to the drawings and particularly to FIG. 1, a scanning apparatus in accordance with one embodiment of the present invention includes a rotatable drum 10 receiving a document 12, the contents of which are to be scanned and converted into an electrical representation for input into a computer or the like. Positioned adjacent the drum 10 is a linear image sensor array 14 schematically depicted in FIG. 1 and suitably comprising a 128 element CCD (charge coupled device) image sensor type TC 102 manufactured by Texas Intruments Incorporated. a lens 16 images a horizontal line (axial of drum 10) or a portion of a horizontal line upon the sensor array, and particularly upon a line of sensor elements called photosites or pixels indicated at 18 on the drawing. The amount of charge accumulated in each sensor element is a linear function of the incident light and the exposure time. Periodically, the charge packets accumulated in the image sensor elements are transferred via gating means 20 to a transport shift register 22 wherein the charge packets are moved serially into output amplifier 24. The shift register receives synchronization and shift pulses from sync clock 26 such that successive horizontal "lines" from document 12 are represented by an electrical output from amplifier 24 indicative of the elemental portions or pixels of each line. As will be appreciated, drum 10 is rotated between lines by appropriate motor means (not shown).

In the drawing, the sensor array 18 is shown as positioned toward the left end of drum 10, and transport mechanism (not shown) may be provided for moving the sensor array 14 axially of the drum such that successive paths or swaths of the document are detected. In the particular example, the sensor array is provided with 128 photosites or pixels in a line axial of the drum, but, as hereinafter more fully explained, less than the total number of pixels provide eventual outputs during each circumferential pass around the drum. Consequently there is some overlap in positioning the array for a second pass. Of course, moving the array 14 axially in the FIG. 1 embodiment is not necessary, for example if the document is no wider than the length of the array.

In any case, the shift register 22 provides a serial output initially presenting 128 successive charge values for each line of the document, and these values are consecutively compared in comparison circuit 28 with a predetermined threshold value 30 to convert the output to a series of ones and zeros representing black and white portions of the document in binary fashion. The binary values thus attained are supplied at the shift register output rate to line memory 32, suitably comprising a random access memory or RAM having at least 128 addressable locations. The memory 32 is addressable by a seven bit binary number which is here provided by X address counter 34 employed for addressing line memory 32 and reading out the same on output lead 36.

For read in of information into memory 32, the same counter is used and selects successive addresses which are provided with successive bits of information from comparison circuit 28.

During read in, address counter 34 is synchronized in operation with shift register 22 of array 14 by employing sync clock 26 as a counting input. The address counter 34 is started from zero with a sync pulse from sync clock source 26 coinciding with the start of a "scan" by array 14. Read in and readout of memory 32 take place in successive steps as will hereinafter be more fully explained.

As hereinbefore indicated, the accuracy presupposed by the large number of photosites or pixels available is not necessarily matched by the mechanical movement associated with drum 10. Thus, a straight line in the Y direction or circumferential direction of drum 10 should consistently cause a change in output from the same pixel or group of pixels of array 14, but may not. The electrical representation of the "vertical" line in the Y direction may appear "wavy" in the X direction (axial of the drum) if the electrical output 36 were applied to reproducing apparatus.

Figure 2:
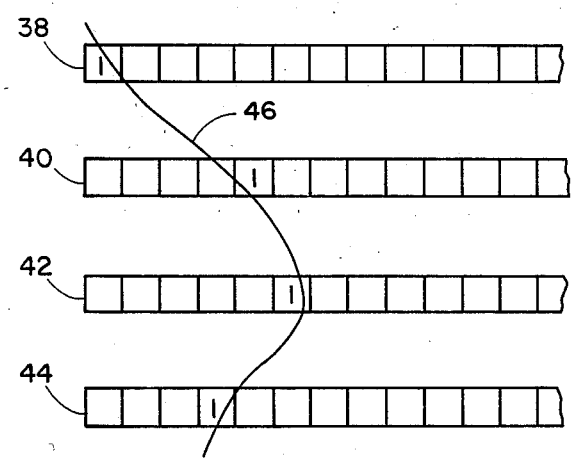
Figure 3:
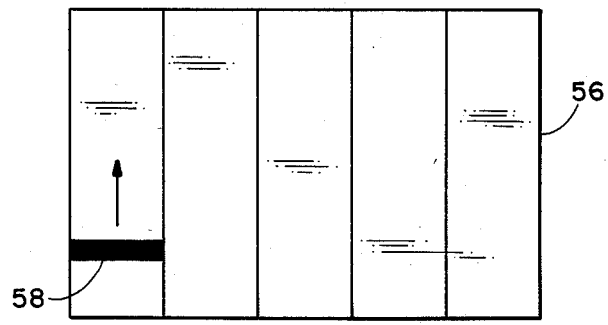

Referring to FIG. 2, several lines of pixels are indicated at 38, 40, 42 and 44 and are indicative of successive states of the line of pixels in array 14 viewing a "straight" vertical line 46. A distorted electrical readout is produced (exaggerated for emphasis in the drawing) because of imperfect rotational movement of drum 10. This "straight" line 46 produces a binary one charge at different locations in the array for the different successive states 38, 40, 42 and 44 as indicated by the differing positions of the numeral "1" on the drawing.

According to the present invention, this condition is rectified by electrically shifting the incremental information from the array in accordance with the mechanical mispositioning of the information relative to the array for any particular horizontal (X axis) line. Offsets are generated for the various rotational positions of drum 10, i.e. for successive scan lines produced by array 14, and these offsets are employed to preaddress X counter 34 used in reading out line memory 32. Referring again to FIG. 2, in the example no offset is added to the address for reading out the line represented at 38, an offset of five is added to the address of the line represented at 40, an offset of six is added to the address of the line represented at 42, and an offset of four is added to the address of the line represented at 44.

The aforementioned offsets are easily generated by first reading a true "vertical" line or straight edge on the document 12 secured to drum 10, for example the line 48 in FIG. 1. A calibration preset memory 52 receives inputs enabled by array 14 (via comparator circuit 28 and AND gate 50 as schematically illustrated in FIG. 1) indicative of the vertical line at addresses successively generated by Y address counter 54 operated in synchronism with rotation of drum 10. The output from comparator circuit 28 enables AND gate 50 which passes the address count from counter 34 indicative of the "one's" X axis location in FIG. 2 for storage in memory 52. Thus, the X axis positions corresponding to the one's depicted in FIG. 2 are stored in calibration preset memory 52. Then during subsequent operation of the apparatus, the presets are read out and added to the address in address counter 34 prior to using address counter 34 for accessing line memory 32 for output of a line. As will be seen, the addressing for read-out of each successive line will in this example begin at the locations indicated at the one's in the illustration in FIG. 2. The output from line memory 32 on lead 36 for each successive scan will fall at the correct timed location to indicate the data from the document in the same manner as if the rotational movement of drum 10 were perfectly true.

The sequence of operations for readout of line memory 32 is as follows:

1. Preset address counter 34 to zero.
2. Load line memory 32 with data for a line from array 14.
3. Preset or load address counter 34 with an offset from calibration memory 52 as addressed by Y counter 54 corresponding to a given rotational position of the drum.
4. Read out line memory 32 by successively clocking address counter 34 such that a sequence of readout of addresses is generated and information is provided on line 36.
5. Advance the drum 10 to the next scan position.
6. Advance Y address counter 54.
7. Repeat the above sequence.

Y address counter 54 suitably comprises a shaft encoder or other mechanism operated in synchronism with motive means (not shown) for rotating drum 10.

For enabling the abovementioned position-correcting of the data to account for mechanical imperfections, fewer than the maximum number of the pixels generated by array 14 are utilized. In particular, 96 of the total 128 pixels were used for data output in a particular embodiment, allowing a plus or minus movement of 16 pixels in adjusting for mechanical mispositioning.

Figure 4:
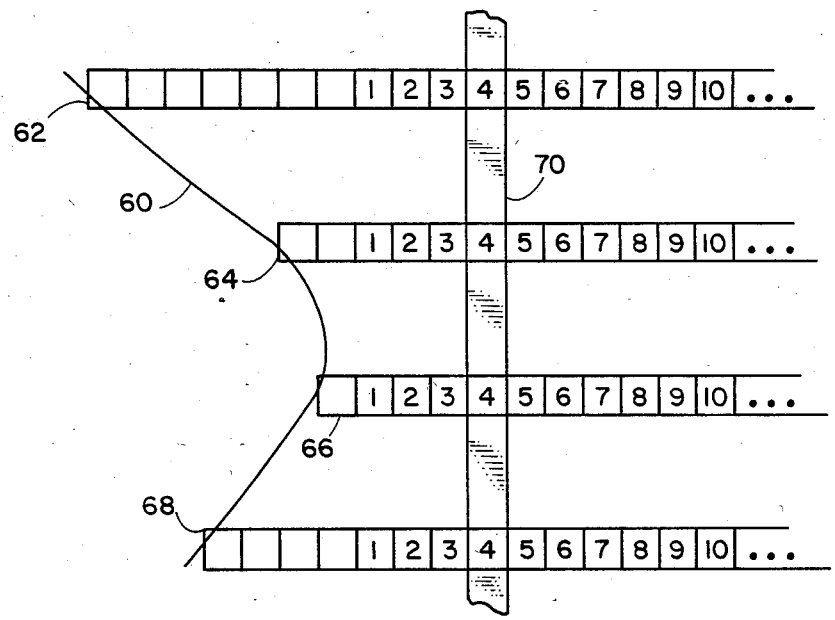

FIG. 4 schematically illustrates a "pushbroom" document scanner of the flatbed type wherein the document 56 is stationary, and the linear image sensor array 58 (suitably a type TC 102 image sensor manufactured by Texas Instruments, Incorporated) is moved along a column of the document in the direction indicated by the arrow. The same array is suitably transferred in the X axis to successive columns and then moved in the Y direction to scan each particular column. The mechanical system for conveying the array 58 over the face of the document is subject to mechanical imperfection resulting in misaligned output information, and the correction thereof is accomplished in the same manner as indicated with respect to the FIG. 1 embodiment with the exception that obviously no drum is involved, and the Y address corresponds to the Y position (in the direction of movement indicated by the direction of the arrow in FIG. 4) of array 58.

Referring to FIG. 4, line 60 indicates the non-linear path of array 58 in the Y direction, with successive positions of the array being indicated at 62, 64, 66 and 68. As in the embodiment described in connection with FIG. 1, offsets are provided to calibration memory 52 representative of the misaligned position for each successive scan line. In this case, the "straight line" method is again used for loading calibration memory 52, at this time in a negative sense or inverted sense such that the offsets are subtracted from the initial count of address counter 34 as used in reading out line memory 32. As will be seen from FIG. 4, if the initial position of the "straight" line used in calibrating is eight pixels to the left of where it should be (for position 62) then reading out of line memory 32 at the "one" position starts with the eighth pixel. In the case of the line position indicated at 64, readout starts with the third pixel, etc.

In the depiction of FIG. 4, assume that a true "vertical" line 70 is to be read out on a document. This vertical line will correctly intersect the fourth addressed pixel for each of the array positions 62, 64, 66 and 68 despite mechanical misalignment of the device.

It is seen that mechanical misalignment of the device in either embodiment is compensated by shifting the electrical data generated in array 14 or retiming the data as read out from memory 32. Successive corrections are applied as successive lines are read out, i.e. as relative movement between the document and the pixel array takes place in the Y direction.

Although calibration preset memory 52 may comprise a random access memory, it will be appreciated that once the memory 52 in effect stores the mechanical misalignment of the scanning mechanism for each scanning line, no change should be required during subsequent operation of the scanning apparatus. Consequently, the memory 52 may comprise a read only memory (ROM) wherein the preset information is "burned" into the ROM. The circuitry shown in dashed line including gate 50 in FIG. 1 may be employed only in the initial manufacture of the scanning apparatus according to the present invention.

While line memory 32 is described herein as storing a binary one or zero representing each pixel, it is understood the memory may be expanded to store gray-scale values, in which case comparison circuit 28 would be replaced with an appropriate analog-to-digital converter.

While I have shown and described plural embodiments of my invention, it will be apparent to those skilled in the art that many other changes and modifications may be made without departing from my invention in its broader aspects. I therefore intend the appended claims to cover all such changes and modifications as fall within the true spirit and scope of my invention.

I claim:

1. A scanning apparatus for producing an electrical representation of two-dimensional information, comprising:
   means for electrically scanning across said two-dimensional information in a first direction at spaced locations in an orthogonal direction to produce electrical information representative of successive scans across said information,
   and means responsive to the extent of mechanical misregistration between said scanning means and said two-dimensional information in said first direction for selecting the electrical information representative of selected scans in accordance with the extent of mechanical misregistration during said selected scans.

2. The apparatus according to claim 1 wherein said means responsive to the extent of mechanical misregistration for selecting the electrical information comprises memory means for receiving the electrical information and means for addressing the memory means in accordance with preset values representative of the extent of mechanical misregistration on successive scans.

3. A scanning apparatus for producing an electrical representation of two-dimensional information by providing relative movement between a photosensitive array and said two-dimensional information, wherein serial data is derived from said array for representing information along said array, and said relative movement is cross-ways of said array, said apparatus comprising:
   first means for receiving said serial data,
   and means for electrically reading out said data from said first means in response to the relative position between said array and said information to adjust the positioning of said data in accordance with mechanical mispositioning of said array relative to said information.

4. The apparatus according to claim 3 wherein said first means comprises memory means for storing said serial data, and said means for electrically reading out said data comprises means for addressing said memory means, said means for addressing said memory means receiving offset values in accordance with the relative positioning between said array and said two-dimensional information in the direction cross-ways of said array for varying the addressing of data in said memory means.

5. The apparatus according to claim 4 wherein said offset values are provided in response to receiving data represenative of a straight line in said two-dimensional information extending cross-ways of said array.

6. The apparatus according to claim 3 wherein less than the available number of pixel outputs of said array are read out from said first means to allow for said adjustment without losing data.

7. A scanning apparatus for producing an electrical representation of information on a document by providing relative movement between a photosensitive array and said document wherein said scanning apparatus is characterized by mechanical inaccuracies such that the electrical representation could be inexact due to mechanical tracking, said apparatus comprising:
   means for receiving incremental information from said array representing elements of lines of information across said document and supplying an electrical output representative thereof,
   and means for electrically shifting said incremental information in accordance with relative movement between said document and said array in proportion to predetermining offsets for selected lines of information.

8. The apparatus according to claim 7 wherein said means for receiving incremental information comprises memory means for storing increments of said information at successive addresses, and said means for electrically shifting said incremental information comprises means for successively addressing said memory means wherein the addresses for selected lines of information in said memory means have offset values algebraically added thereto according to the extent of mechanical misregistration present during the scanning of said selected lines.

9. The apparatus according to claim 8 wherein said means for addressing said memory means comprises an address counter and including means synchronized with said relative movement for algebraically adding said offset values to said counter in accordance with the relative position between said array and said document.

10. The apparatus according to claim 9 wherein said means for addressing said memory means further includes additional memory means storing offset values corresponding to relative positions between said array and said document, said additional memory means being accessed by said means synchronized with said relative movement.

11. The method of scanning a document to provide an accurate electrical representation thereof despite inaccuracies in mechanical scanning movement, comprising the steps of:

scanning said information in a first direction and, at successively removed locations in an orthogonal direction, repeatedly scanning said information in said first direction to produce a serial electrical output representative of successive lines of said information, and means for repositioning serial electrical output data representative of selected of said lines of information relative to other lines of information in accordance with predetermined offsets for said selected lines of information to compensate for inaccuracies in scanning displacement thereof.

12. The method according to claim 11 further including obtaining said offsets by scanning a document with a straight line in said orthogonal direction and storing said offsets for use in repositioning said serial electrical output data.

13. The method of scanning a document to provide an accurate electrical representation thereof despite inaccuracies in mechanical scanning movement, said method comprising the steps of:

electrically scanning across said document in a first direction to produce a series of elemental values representative of a line across said document, and then repeatedly scanning across said document in said first direction but at successively removed locations to produce series of elemental values representative of lines substantially parallel to said first line, and changing the time of output of said elemental values for each line substantially in proportion to a predetermined offset value for each line which offset value is indicative of the physical displacement of each line by the inaccuracy of mechanical movement.

14. The method according to claim 13 further including producing more elemental values than are employed for output and discarding values selected according to the displacement of each line brought about by the inaccuracy of mechanical movement.

* * * * *